FOSDICK & CRAWFORD.
Clover Huller.

No. 37,162. Patented Dec. 16, 1862.

WITNESSES:

INVENTORS:

UNITED STATES PATENT OFFICE.

GEORGE W. FOSDICK AND JOHN CRAWFORD, OF DOWAGIAC, MICHIGAN.

IMPROVEMENT IN MACHINES FOR THRASHING AND HULLING CLOVER-SEED.

Specification forming part of Letters Patent No. 37,162, dated December 16, 1862.

*To all whom it may concern:*

Be it known that we, GEORGE W. FOSDICK and JOHN CRAWFORD, both of Dowagiac, in the county of Cass and State of Michigan, have invented a new and Improved Machine for Thrashing and Hulling Clover-Seed; and we do hereby declare that the following is a full, clear, and exact description of the same, reference being had to the accompanying drawings, making a part of this specification, in which—

Figure 1:
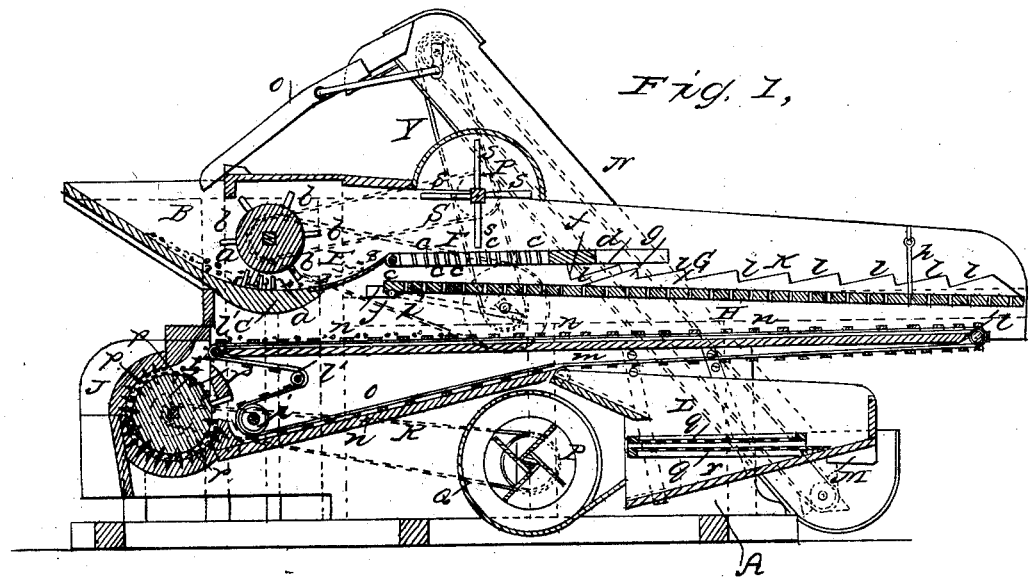
Figure 2:
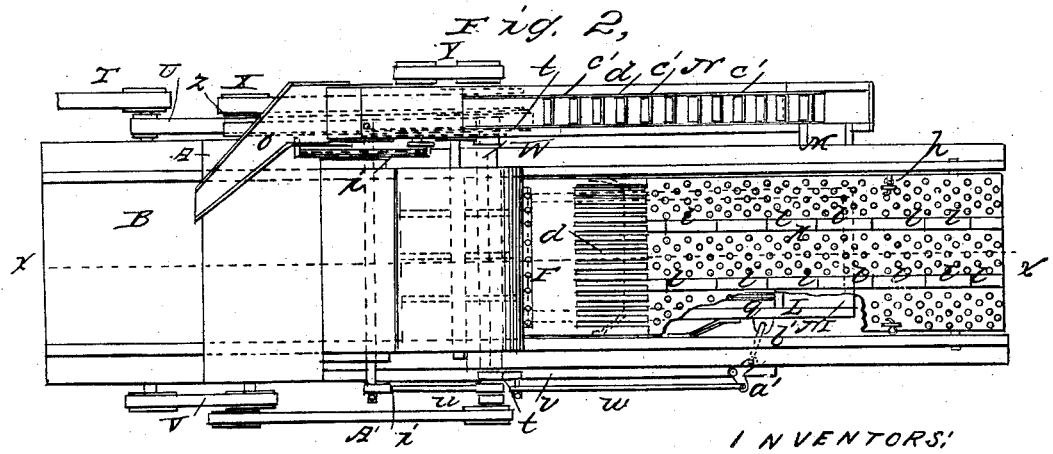

Figure 1 is a side sectional view of our invention, taken in the line $x\ x$, Fig. 2. Fig. 2 is a plan or top view of the same.

Similar letters of reference indicate corresponding parts in the two figures.

The object of this invention is to obtain a machine by which clover-seed may be thrashed from the straw and the latter separated from the heads, and the seed also separated from the hulls, the whole operation being performed simultaneously and the work done in a perfect manner.

To enable those skilled in the art to fully understand and construct our invention, we will proceed to describe it.

A represents a suitable framing, which is inclosed so as to form a box having a hopper, B, at one end, at the lower end of which there is a concave, C, provided with teeth $a$. Directly over the concave C there is a cylinder, D, which is provided with radial teeth $b$, so arranged that as the cylinder rotates they will pass between the teeth $a$ of the concave. E is an apron, which extends from the end of the concave C to a screen, F, which is composed of transverse slats $c$, fitted in a suitable frame, and having longitudinal slats $d$ at its outer or discharge end. The inner end of the screen F is secured within the box by a joint or hinge, $e$, and said screen has two beveled pendants, $ff$, attached to it, which rest on two similar projections, $g\ g$, secured to the upper surface of a shaker or straw-carrier, G, which is placed within the box directly below the screen F, and extends the whole length of the box. The outer part of the shaker or straw-carrier G is suspended by straps $h\ h$ to the front part of the box, and at its back part it is supported by horizontal pins or journals, $i\ i$, which are fitted in oblong horizontal slots, $jj$, in the sides of the box. The shaker is perforated with small holes, and to its upper surface there are attached longitudinally two bars, $k\ k$, which are notched so as to form a series of inclined surfaces, $l$, (shown clearly in Fig. 1,) and of the same form as the projections $g\ g$, the latter being in line with and forming a continuation of the bars $k\ k$.

Within the box, and below the shaker or straw-carrier G, there is an endless slotted apron, H, which works over rollers $l'$ and around a horizontal board or partition-plate, $m$. The apron H is formed of a series of slats, $n$, attached to bolts $o\ o$, which pass around the rollers aforesaid. The upper part of the apron H is directly underneath the shaker or carrier G, and its lower part extends down in front of a hulling device formed of a cylinder, I, fitted within a concave, J. The concave J extends fully around two-thirds the circumference of the cylinder I, as shown in Fig. 1. The cylinder I is constructed of wood, and has small nails or tacks $p$ driven into its periphery all around it to form a corrugated rubbing-surface. The concave J is formed in the same manner. Directly in front of the concave J there is an inclined board, K, over which the lower part of the apron H works or passes, and at the outer end of the inclined board K there is a shoe, L, provided with screens $g\ g$. At the front end of the shoe L there is placed transversely a trough, M, which is inclined and leads into the lower part of an inclined elevator-trough, N, which is secured to one side of the box of the machine and has a spout, O, leading from its upper end into the hopper B. The bottom $r$ of the shoe is inclined, its inner end being the lowest. Directly underneath the outer part of the inclined board K there is placed a fan, P, said fan being within a suitable case, Q, and directly over the screen F there is placed a picker, R, which is formed by teeth $s$, projecting radially from a shaft, S. The shaft of the rubbing-cylinder I is driven by a belt, T, and from said shaft the fan P is driven by a belt, U. The thrashing-cylinder D is also driven from this same shaft by a belt, V. From the shaft of the thrashing-cylinder a shaft, W, is driven by a belt, X. This shaft W has two cranks, $t\ t$, on it, one near each end, from which a reciprocating movement is given the shaker or carrier G by rods $u\ u$, the latter being connected to the pins $i\ i$ at the inner part of the shaker. A shake motion is given the shoe L by means of a crank, $v$, on one end of the fan-shaft, a connecting-rod, $w$, attached to said crank at one end and having its opposite end attached to a bell-crank, $a'$, which is connected with the shoe by a rod, $b'$. The elevators in the trough N are formed by slats $c'$, attached transversely to an endless belt, $d'$, the latter being operated by a belt, Y, from the shaft W. The picker R is driven from the shaft of the thrashing-cylinder by a belt, Z. The apron H is driven by a belt, A', from the shaft S of picker R.

The operation is as follows: The clover seed and straw is placed in the hopper B and is drawn in between the toothed cylinder D and concave C, the clover-heads being thrashed from the straw by this operation. The detached heads and straw pass on the screen F, and are subjected to the action of the picker R, the heads passing through the screen on the inner part of the shaker or carrier G. The screen F has a vertical vibrating movement imparted to it by the reciprocating movement of the shaker or carrier, in consequence of the beveled pendants $f\,f$ resting on the inclined projections $g\,g$ of the shaker. The straw is discharged from the outer end of the shaker or carrier G, the notched bars $k\,k$ serving to lighten it up as it is conveyed along, and thereby insure a thorough separation of the heads therefrom. The heads pass through the perforations of the shaker or carrier and fall upon the horizontal board or partition-plate $m$, from whence they are raked off and carried by the apron H to the hulling-cylinder I, between which and the concave J they pass, and the seed-huller. The hulled seed is carried by the apron H up the inclined board K and discharged on the screens $g\,g$, through which the seed passes, and is discharged from the lower end of the inclined bottom $r$. The seed, in passing through the screens, is subjected to a blast from the fan P, and deprived of all foreign impurities, and any unhulled seed or heads are discharged from the outer ends of the screens $g\,g$ and conveyed by the trough M into the lower part of the elevator-trough N, and carried up by the elevators and deposited in the hopper B, so that they may be again subjected to the hulling process.

The whole arrangement is extremely simple and efficient, and the work is performed in a thorough manner.

Having thus described our invention, what we claim as new, and desire to secureby Letters Patent, is—

1. The arrangement of the thrashing-cylinder $d$, concave C, picker R, apron E, screen F, and pendants $f$, with the carrier G, in the manner herein shown and described.

2. The combination of the parts above named, when arranged in the manner stated, with the apron H, hulling-cylinder I, shoe L, fan P, and elevator N, as herein shown and described.

3. The arrangement of the apron H and boards $m\,k$ with the concave J, cylinder I, and shoe L, in the manner herein shown and described.

GEO. W. FOSDICK.
JOHN CRAWFORD.

Witnesses:
D. MONTGOMERY,
C. C. CLARK.